United States Patent [19]

Helle et al.

[11]     4,302,374
[45] * Nov. 24, 1981

[54] STABLE DISPERSION OF POSITIVELY CHARGED POLYFLUOROCARBON RESIN PARTICLES

[75] Inventors: Kees Helle, Bennekom; Robert C. Groot, Rheden, both of Netherlands

[73] Assignee: AKZO N.V., Arnhem, Netherlands

[*] Notice: The portion of the term of this patent subsequent to Jul. 14, 1995, has been disclaimed.

[21] Appl. No.: 885,332

[22] Filed: Mar. 10, 1978

Related U.S. Application Data

[63] Continuation of Ser. No. 728,225, Sep. 30, 1976, abandoned.

[30]     Foreign Application Priority Data

Oct. 4, 1975 [NL] Netherlands ......................... 7511701

[51] Int. Cl.$^3$ ............................................. C08L 27/18
[52] U.S. Cl. ............................ 260/29.6 F; 204/181 R; 427/435
[58] Field of Search ................... 260/29.6 F; 427/345, 427/435, 437; 204/16, 46 G, 49, 181 R

[56]     References Cited

U.S. PATENT DOCUMENTS

| | | | |
|---|---|---|---|
| 2,559,752 | 7/1951 | Berry | 260/29.6 |
| 3,677,907 | 7/1972 | Brown | 204/16 |
| 3,787,294 | 1/1974 | Kurosaki | 204/181 N |

FOREIGN PATENT DOCUMENTS

| | | |
|---|---|---|
| 7203718 | 4/1973 | Netherlands . |
| 1366823 | 9/1974 | United Kingdom . |

*Primary Examiner*—Paul R. Michl
*Attorney, Agent, or Firm*—Stevens, Davis, Miller & Mosher

[57]     ABSTRACT

An aqueous stable dispersion of positively charged polyfluorocarbon resin particles having a particle size of less than about 10 μm contains both a cationic and a nonionic fluorocarbon surfactant in a molar ratio between 25:1 and 1:3.5 and in a total amount of at least $3 \times 10^{-3}$ millimoles per m$^2$ of surface area of said particles.

The fluorocarbon surfactants give the dispersions storage-stability even in the presence of a strong electrolyte and make them suitable for use in electroplating baths.

13 Claims, No Drawings

STABLE DISPERSION OF POSITIVELY CHARGED POLYFLUOROCARBON RESIN PARTICLES

This is a Continuation of application Ser. No. 728,225 filed Sept. 30, 1976 now abandoned.

The invention relates to improved dispersion of positively charged polyfluorocarbon resin particles, and, if desired, particles of a different material, which resin particles have an average particle size of less than about 10 μm. More particularly, this invention concerns storage-stable aqueous dispersions of positively charged polyfluorocarbon resin particles containing dissolved therein effective amounts of cationic and nonionic fluorocarbon surfactants. Netherlands Pat. No. 7,203,718 describes a dispersion of polyfluorocarbon resin particles of the above-mentioned size, which are kept in dispersion in the presence of a cationic fluorocarbon surfactant and a nonionic surfactant.

The above-described dispersion suffers from serious deficiencies relating to an inadequate stability during periods of storage. More specifically, the known positively charged polyfluorocarbon dispersions tend to irreversibly coagulate in a solution of a strong electrolyte such as is present in an electroplating bath.

Although this phenomenon can be remedied somewhat by continuous agitation of the bath, it will yet be necessary after some time to redisperse the particles. This disadvantage will be even more manifest if the bath is used at long intervals.

It is an object of this invention to provide dispersions which do not show the drawbacks of the known dispersions.

Another object of the invention is to provide a process for preparing such dispersions.

The foregoing objects and others are accomplished in accordance with the invention if the dispersion of the type indicated above as known contains (a) a nonionic fluorocarbon surfactant;
(b) a cationic and a nonionic fluorocarbon surfactant in a molar ratio between about 25:1 and 1:3.5;
(c) a total amount of fluorocarbon surfactants of at least $3 \times 10^{-3}$ millimoles per $m^2$ of surface area of the polyfluorocarbon particles.

For the determination of the surface area of the particles use may with advantage be made of the nitrogen adsorption method of Brunauer, Emmett and Teller (BET) standardized in the German Industrial Standard Method DIN No. 66 132.

The use of a nonionic fluorocarbon surfactant in the depositing from an electroplating bath of a metal coating containing polyfluorocarbon resin particles is disclosed in U.S. Pat. No. 3,787,294.

In said specification it is stated, however, that under the conditions of the electrolysis this nonionic fluorocarbon compound must show cationic properties. No mention is made at all of the possible advantages of the combination of a cationic surface active compound and a nonionic surface active compound.

Moreover, the amounts of wetting agent used per gramme of polymer in the examples are absolutely insufficient to obtain a reasonably stable dispersion.

It will be clear that a stable dispersion is a prerequisite in electrolytically depositing a metalcoating containing finely divided resinous particles.

Also in U.S. Pat. No. 3,677,907 (to H. Brown et al.) mention is made in an enumeration of a great number of fluorocarbon surfactants of one compound of the nonionic type.

But the wetting agents used in the examples are all of the anionic type. For the use of a mixture of fluorocarbon surfactants of both the cationic and the nonionic type no suggestions are made in it at all, let alone for the proportions in accordance with the present invention.

Said patent specification does mention that favourable results may be obtained by the side-by-side use of various types of surface active compounds. But then only the use is meant of a surface active fluorocarbon compound in combination with a surface active compound of the usual hydrocarbon type.

The object of the use of the last-mentioned compound is that from the bath organic impurities such as dust, traces of coating material etc. are taken up in micelles and thus masked. Use is made of such a combination also in the above-mentioned Netherlands Pat. No. 7,203,718.

Although the dispersions according to the invention have unexpectedly good properties, it has yet been found that in some cases the stability of the dispersions is not quite satisfactory.

For this reason the invention provides a dispersion in which the total amount of fluorocarbon surfactants is within the range of from about $6.10^{-3}$ to $12.10^{-3}$ mmoles per m2 of surface area of the particles.

As this last mentioned range makes it possible for the stability of the dispersions to be exceptionally high, it is of particular advantage for industrial applications.

The use of more than $12.10^{-3}$ mmoles of surface active fluorocarbon compounds per m2 of polyfluorocarbon resinous particles will not generally lead to any additional advantage. Moreover, the cost aspect will play a role then.

For the price of the fluorocarbon surfactants per unit of weight is a multiple of that of the polyfluorocarbon resinous particles to be included.

The proportion of nonionic surfactants should be strictly within the limits indicated. If the cationic and the nonionic surfactants are used in a molar ratio higher than 25:1, then the quality of the dispersion will quickly drop to the level at which agglomeration occurs. Agglomeration will also take place at a molar ratio smaller than 1:3.5, as a result of which and because of a smaller charge on the particles, the extent to which they are included is very much reduced.

It should be noted that said proportion exclusively holds for surface active fluorocarbon compounds. For in some cases it may be of advantage also to add to the dispersion a nonionic surface active compound which does not contain fluorine in order that organic impurities which do not or hardly contain any fluorine may be taken up in micelles and thus be masked.

To this end use may be made of the condensation products of octyl phenol and ethylene oxide (marketed by Rohm & Haas under the trade name "Triton X-100"), of nonyl phenol and ethylene oxide (known under the trade names NOP 9 and Kyolox NO90 and marketed by Servo and Akzo Chemie, respectively) and of lauryl alcohol and ethylene oxide. The amounts to be used thereof very much depend on the organic impurities contained in the dispersion.

For a man skilled in the art it will not be difficult to choose for each particular case the most favourable amount, which is generally within the range of from 0.005 to 1 percent by weight of the dispersion.

In some case it may be desirable that besides the polyfluorocarbon resinous particles there are incorporated into the dispersion according to the invention particles of other polymers or inorganic materials such as diamond, carborundum, $Al_2O_3$, $SiO_2$, pigments etc. In such cases advantage may be derived from the further addition of a surface active cationic compound which does not contain fluorine in combination or not with a nonionic compound of the same type. For the amounts to be used thereof the same criteria may be used as indicated above for the fluorocarbon compounds. The molar ratio nonionic to cationic, however, is far less critical here. The same may be said for the total amounts to be employed.

It has been found that always very good results are obtained if the non-ionic surface active fluorocarbon compound is present in an amount of about 17 to 36 mole percent of the total amount of surface active fluorocarbon compounds used for the dispersion of the particles. Optimum results will generally be obtained if the nonionic fluorocarbon compound is present in an amount of about 26 mole percent of the total amount of surface active fluorocarbon compounds used for the dispersion of the particles. By cationic surface active fluorocarbon compounds are to be understood here all simple or composite surface active compounds having fluorine-carbon bonds (C-F bonds) and being capable of imparting a positive charge to the fluorocarbon resin particles in the dispersion.

It is preferred that use should be made of perfluorinated compounds having a quaternary ammonium group. Suitable cationic surface active compounds of the simple type are those that are described in British Pat. No. 1,424,617.

In this connection reference may be made also to the following cationic fluorocarbon compounds, which are derived from fluorocarbon anionic wetting agents having the general formula $CF_3(CF_2)_n COOH$ or $CF_3(CF_2)_n SO_3H$, where n=4-18. After esterification with a lower alcohol compounds with the formula $CF_3(CF_2)_n COOH$ may first be treated with ammonia to form the amide and subsequently converted into the respective amine by the Hofman reaction.

The amine may in its turn easily be converted into a cationic wetting agent, such as a tetra-alkyl ammonium salt, for instance by exhaustive alkylation, or into a hydrochloric acid salt by reaction with hydrochloric acid.

Another more general method of converting anionic wetting agents into their cationic counterparts comprises reacting an alkyl diamine such as ethylene diamine or a compound of the type

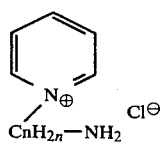

with the respective anionic wetting agent.

A suitable cationic wetting agent may be a fluorocarbon compound of the general formula

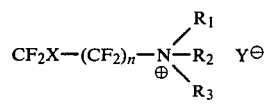

wherein X is a hydrogen atom or a halogen atom, R1, R2 and R3 are alkyl groups having not more than 4 carbon atoms, Y is a halogen atom, and n represents an integer from 2 to 8.

Composite surface active compounds of the fluorocarbon type are preferably prepared in situ by pouring a negatively charged dispersion of fluorocarbon resin particles wetted with an anionic surface active fluorocarbon compound in a gently stirred aqueous solution of a cationic surface active compound.

This compound need not be of the fluorocarbon type. It should be present in a molar excess relative to the anionic compound used for the dispersion of the fluorocarbon particles.

It is preferred to use a molar ratio higher than 3. Examples of cationic dispersions of fluorocarbon resin particles thus prepared are described in for instance the British Pat. No. 1,388,479. Other examples of suitable surface active cationic fluorocarbon compounds of the simple type are:

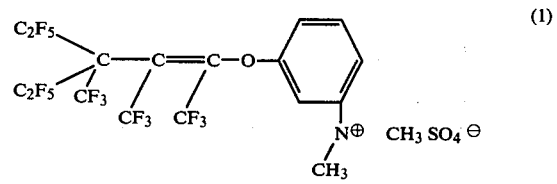

which is marketed by ICI under the trade name Monflor 71

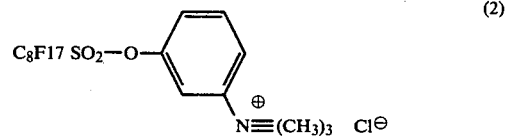

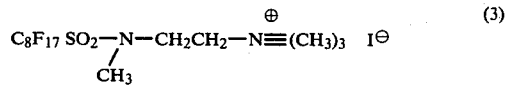

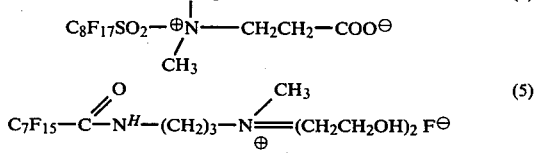

marketed by Hoechst under the trade name Hoechst S 1872.

(6) $C_8F_{17}SO_2N^H-(CH_2)_3-N^{\oplus}\equiv(CH_3)_3$ $I^{\ominus}$ marketed by Minnesota Mining & Manufacturing Company under the trade name FC 134.

For the anion it is generally preferred that instead of the $I^-$-ion those anions should be used of which it is known that they are chemically more inert. As examples of such anions may be mentioned $Cl, ^-SO^{2-}_4$ or $CH_3SO^-_4$.

The compound under 4 is in fact amphoteric, but has cationic properties under appropriate conditions such as a relatively low pH (e.g.4). Of the above-mentioned compounds the wetting agents which have a straight fluorocarbon chain, have been found to give more satisfactory results.

The nonionic surface active fluorocarbon compounds used in the dispersions according to the invention are as a rule perfluorinated polyoxyethylene compounds.

A suitable commercially available surface active fluorocarbon compound with nonionic properties is marketed by ICI under the trade name Monflor 52.

This compound is characterized by the following structural formula:

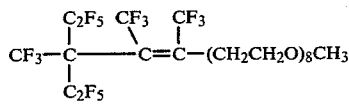

A disadvantage of this compound is the non-linear fluorocarbon chain, as a result of which it will less readily adjoin the polyfluorocarbon resin particles.

To remove this drawback the invention provides a process in which as nonionic fluorocarbon—containing wetting agent there is used a compound having the following structural formula:

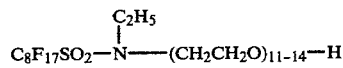

where $C_8F_{17}$ represents a straight chain. The last mentioned wetting agent is marketed by Minnesota Mining & Manufacturing Company under the trade name FC 170.

Other examples of nonionic surface active fluorocarbon compounds that may be used in the dispersion according to the invention are:

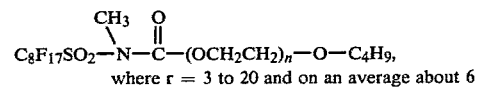
where r = 3 to 20 and on an average about 6

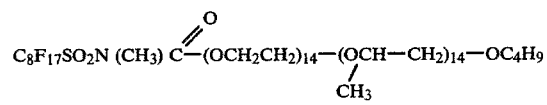

The number of the ethylene oxide groups of the nonionic surface active fluorocarbon compounds which may with advantage be used according to the invention is at least 2 and as a rule not more than 18.

The hydrophilic properties of nonionic surface active fluorocarbon compounds may, of course, also be obtained by using groups other than those derived from ethylene oxide. As example may be mentioned a group derived from polyglycerol.

As examples of polyfluorocarbon resins that may with advantage be used in the dispersion according to the invention may be mentioned polytetrafluoroethylene, polyhexafluoropropylene, polychlorotrifluoroethylene, polyvinylidene fluoride, tetrafluoroethylene-hexafluoropropylene copolymer, vinylidenefluoride-hexafluoropropylene copolymer, fluorsilicon elastomers, polyfluoroaniline, tetrafluoroethylene, trifluoronitrosomethane copolymer and graphite fluoride.

Of all these compounds the properties may be varied by incorporating substances such as pigments, colourants, soluble chemical compounds, compounds with capped or non-capped reactive terminal groups, inhibitors and dispersion agents.

The present invention also provides a process for preparing a stable dispersion of positively charged polyfluorocarbon resin particles, and, if desired, particles of a different material, which resin particles have an average particle size of less than about 10 μm, by incorporating therein a cationic fluorocarbon surfactant and a nonionic surfactant, the improvement comprising in that:

(a) for the nonionic surface active compound a fluorocarbon compound is used;

(b) the molar ratio between the cationic surface active compound and the nonionic surface active fluorocarbon compound is chosen between 25:1 and 1:3.5;

(c) the total amount of surface active fluorocarbon compounds is at least $3 \times 10^{-3}$ mmoles per m$^2$ of surface area of the polyfluorocarbon particles.

The dispersions of polyfluorocarbon resin particles according to the invention are essentially characterised by their positive charges and high stability. Their stability is at least as high as that of dispersions with negatively charged particles stabilized with a non-ionic surfactant of the hydrocarbon type. They are not liable to coagulation as a result of, for instance, agitation or vibrations, and they are stable at ambient temperature, for several years. They need not be stirred periodically so as to avoid too much settling. A precipitate, if formed at all, can easily be redispersed simply by stirring. Even the addition of electrolytes will not cause them to coagulate. This last-mentioned feature, combined with their positive charge make them excellently suitable to be used in an electroplating process such as described in British Pat. No. 1,424,617.

They may also be used in coating formulations such as described in U.S. Pat. No. 3,692,727.

Other industrial uses of the dispersions according to the present invention are the manufacture of electrical insulators and conveyor belts. Another interesting application is the impregnation with the present dispersions of porous coating layers.

In the preparation of the dispersions according to the present invention use may be made of methods known in the techniques for preparing paints and pigments. Such a preparation is preferably so carried out that one part of a powdered polyfluorocarbon compound is mixed with 1 or more parts of water, followed by successively including therein the surface active compounds and vigorous mixing. The suspensions may be diluted to the desired concentration with the use of water or a electrolyte solution.

The invention will be further described in the following examples, which set forth embodiments of the invention for purposes of illustration and not limitation.

In the examples use is made of two types of polytetrafluorethylene powders, which are marketed by ICI under the trade names FLUON L 169 and Fluon L 170. Moreover, use is made of a tetrafluoro-ethylene hexafluoropropylene copolymer dispersion in water, which is marketed by Du Pont under the trade name FEP 120. Fluon 170 is brittle and is mainly present in the form of agglomerates. The particle size distribution is dependent on the dispersing method used.

For instance by making use of a sedimentation analysis technique described by H. E. Rose in "the Measurement of Particle Size in very fine Powders", London (1953), it can be determined what percentage of particles is still present in the form of agglomerates. It should be noted that the particle size distribution is also influenced by the amount of electrolyte contained in the bath liquid.

The measurements were all carried out on solutions which contained 2% by weight of particles.

In the preparation of the PTFE dispersion 1 part by volume of PTFE in two parts of water was stirred for 20 minutes with a high speed turrax stirrer. The speed of the turrax stirrer was 10,000 revolutions per minute. In the preparation of larger amounts of PTFE dispersion (some kilogrammes of PTFE) use was made of a Silverson stirrer of the TEFG type (1.0 h.p.) having a speed of 3,000 r.p.m.

For the dispersion prepared under these conditions the specific surface area determined by the nitrogen adsorption method in conformity with DIN 66132 was found to be in very good agreement with the specific surface area calculated from the particle size measured with a sedimentation analysis.

At a measured mean diameter of about 0.3 $\mu$m the specific surface area was found to be 9 m$^2$/g (Fluon L 170), whereas at a measured mean diameter of >5 $\mu$m (Fluon L 169), the specific surface area was found to be <0.5 m$^2$/g.

The following table shows that these values are in good agreement with those calculated, it being assumed that the PTFE consists of non-porous spheres.

| particle diameter in $\mu$m | surface area in m$^2$/g calculated |
|---|---|
| 0.1 | 28.6 |
| 0.2 | 14.3 |
| 0.3 | 9.5 |
| 0.5 | 5.3 |
| 1.0 | 2.9 |
| 2.0 | 1.4 |
| 3.0 | 1.0 |
| 5.0 | 0.5 |
| 10.0 | 0.3 |

In the examples mainly use is made of the above-mentioned fluorocarbon surfactants FC 134 and FC 170, which are marketed by M.M.M.

In the conversion of the amounts by weight used into the amounts of moles it was assumed that the degree of purity of the above surfactants was about 85 percent and 70 percent by weight, respectively.

EXAMPLE I (for comparison)

With a high-speed turrax stirrer 100 g of PTFE (Fluon L 170) were stirred for 20 minutes in 100 ml of water to which 4 g (6,5 mmoles) of a cationic wetting agent (FC 134) had been added. The contents were subsequently transferred to a 5 l—Watt's nickel bath of the following concentration:

| substance | g/l |
|---|---|
| Ni SO$_4$ . 6H$_2$O | 190 |
| Ni Cl$_2$ . 6H$_2$O | 90 |
| H$_3$B O$_3$ | 30 |

During the electrolysis (about 1 hour at 40° C. and a current density of 2 A/dm$^2$) the bath had to be continuously agitated to prevent the PTFE from depositing.

EXAMPLE II

The experiment of Example I was repeated in such a way that in the preparation of the PTFE dispersion also 1 g (1.35 mmoles) of a nonionic surface active fluorocarbon compound (FC 170) was used. In this case the percentage nonionic was about 17 mole percent and in all 5.5 mg/m$^2$ or 8.7×10$^{-3}$ mmoles/m$^2$ of surface active compound was present.

Stirring the bath to prevent the dispersion from depositing appeared to be quite unnecessary.

EXAMPLE III

The experiment of example II was repeated in such a way that for the preparation of the PTFE dispersion only 250 mg (0.34 mmoles) of FC 170 and 4750 mg (7.7 mmoles) of FC 134 were employed, (molar ratio cationic wetting agent to nonionic wetting agent 23:1).

In all 5.5 mg/m$^2$ of surface active compound was present. The stability of the dispersion was considerably lower than that of the dispersion prepared in Example II.

EXAMPLE IV

The experiment of Example II was repeated in such a way that for the preparation of the dispersion 4 g (5.4 mmoles) of FC 170 and 1 g (1.6 mmoles) of FC 134 were used (molar ratio cationic to nonionic wetting agent 1:3.4).

The resulting dispersion was stable but showed some tendency to agglomerate after one night's standing.

EXAMPLE V

The experiment of Example I was repeated in such a way that use was made of the coarser Fluon L 169 B. This was wetted with 450 mg of FC 134 and 150 mg of FC 170 (about 26 mole percent nonionic). The resulting dispersion did not show any tendency to agglomerate, but the relatively coarse particles slowly precipitated.

EXAMPLE VI

With a high-speed turrax stirrer 100 g of PTFE (Fluon L 170) were stirred for 20 minutes in 100 ml of water to which 4.2 g (6.5 mmoles) of a cationic wetting agent of the following structural formula had been added:

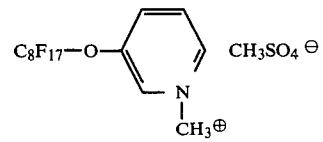

For the nonionic surface active agent use was made of 1 g FC 170 (1.35 mmoles)

The contents were subsequently transferred to a Watt's nickel bath of the following concentration:

| | g/l | |
|---|---|---|
| NiSO$_4$ . 6 H$_2$O | 215 | |
| NiCl$_2$ . 6 H$_2$O | 70 | |
| H$_3$BO$_3$ | 30 | |
| PTFE (Fluon L 170) | 40 | |
| cationic fluorocarbon surfactant | 1.7 | (2.6 mmoles) |
| FC 170 | 0.4 | (0.54 mmoles) |

The pH of the thus prepared strong electrolyte solution was 4.5. Stirring the bath to prevent precipitation appeared to be quite unnecessary.

EXAMPLE VII

In this example it is shown that instead of the simple cationic surface active compounds of the fluorocarbon type employed in the preceding examples use may be made according to the invention of surfactants of the fluorocarbon type obtained by reversing the polarity of an anionic fluorocarbon surfactant.

Two Watt's nickel plating baths were prepared having the following composition:

| | |
|---|---|
| $NiSO_4 \cdot 6 H_2O$ | 240 |
| $NiCl_2 \cdot 6 H_2O$ | 60 |
| $H_3BO_3$ | 30 |
| pH | 4.7 |
| temperature | 40° C. |

In both baths the anode was a plate-straped nickel electrode and the cathode was formed by a stainless steel tube.

Both baths contained a positively charged PTFE dispersion (about 50 g/l). (Fluon L 170). In both cases the positively charged dispersion was obtained by reversing the polarity of a 50 g per liter PTFE—containing dispersion wetted with an anionic fluorocarbon surfactant (6 g of a 30%-solution), marketed by ICI under the trade name Monflor 31.

The structure of Monflor 31 corresponds to the following formula:

$$\begin{array}{c} C_2F_5 \\ \phantom{C_2F_5}\diagdown \\ \phantom{xx}C\text{---}C\text{==}C\text{---}O\text{---}\langle\text{phenyl}\rangle\text{---}SO_3^\ominus \quad Na^\oplus \\ \phantom{C_2F_5}\diagup \phantom{xx}|\phantom{xx}|\phantom{xx}| \\ C_2F_5 \phantom{xx} CF_3 \phantom{x} CF_3 \phantom{x} CF_3 \end{array}$$

For reversing the polarity use was made of an aqueous solution containing 6 g/l of a cationic surfactant having the following formula:

$$C_{12}H_{25}\text{--}\langle\text{phenyl}\rangle\text{--}SO_2\text{--}\underset{H}{N}\text{--}(CH_2)_3\overset{\oplus}{\text{--}}\underset{CH_3}{\overset{CH_3}{N}}\text{--}CH_2\text{--}\langle\text{phenyl}\rangle \quad Cl^\ominus$$

The molar ratio of the cationic surfactant to the anionic surfactant was about 4.

After the dispersion thus prepared had been transferred to a Watt's nickel plating bath of the above mentioned composition the bath had to be continuously agitated to prevent the PTFE from settling.

The above specified surface area of Fluon L 170 being 9 m²/g the anionic fluorocarbon surfactant was present in an amount of $5.9 \times 10^{-3}$ mmoles/m².

Taking into account the above definition of cationic fluorocarbon surfactants, it may be stated that after reversing their polarity they were also present in an amount of $5.9 \times 10^{-3}$ mmoles/m2.

The experiment was repeated using a second PTFE dispersion (Fluon L 170) whose polarity was reversed in the same manner. To this dispersion, however, there had been added 750 mg of the above mentioned nonionic fluorocarbon surfactant FC 170 per 50 g of PTFE. This corresponds to an amount of about 2.2 mmoles/m². So the molar percentage of the nonionic fluorocarbon surfactant was about 27 percent of the total molar amount of fluorocarbon surfactants present.

Stirring the bath to prevent precipitation was found to be quite unnecessary.

EXAMPLE VIII 100 ml of aqueous tetrafluoroethylene—hexafluoropropylene copolymer dispersion marketed by Du Pont under the trade name FEP 120 was centrifuged at 6000 r.p.m. for 30 minutes.

The supernatant layer of clear liquid was decanted. In a porcelain dish the FEP was extracted with 200 ml of boiling methanol for about half an hour. After the methanol had been decanted the powder obtained was dright overnight at 40° C.

With the aid of an ultra turrax stirrer 42 g of FEP powder were dispersed in water with 35 mg of FC 134 and 15 mg of FC 170 per gramme of FEP. The specific surface area of the FEP was about 9 m²/g.

Upon mixing with 2 l of Watt's nickel bath the dispersion remained stable, even after the bath had been evaporated to its original concentration.

What is claimed is:

1. A stable dispersion of positively charged polyfluorocarbon resin particles, and, if desired, particles of a different material, which resin particles have an average particle size of less than about 10 μm, which dispersion contains a cationic fluorocarbon surfactant and a nonionic surfactant, wherein:
   (a) the nonionic surface active compound is a fluorocarbon compound;
   (b) the molar ratio between the cationic surface active compound and the nonionic surface active fluorocarbon compound is between 25:1 and 1:3.5;
   (c) the total amount of surface active fluorocarbon compounds is at least $3 \times 10^{-3}$ mmoles per m² of surface area of the polyfluorocarbon particles.

2. A dispersion according to claim 1 containing from about $6.10^{-3}$ to $12.10^{-3}$ mmoles fluorocarbon surfactants per m² of the surface area of the resin particles.

3. A dispersion according to claim 1 wherein the nonionic surface active fluorocarbon compound is present in an amount of about 17 to 36 mole percent of the total amount of surface active fluorocarbon compounds used for the dispersion of the resin particles.

4. A dispersion according to claim 1 wherein the nonionic fluorocarbon compound is present in an amount of about 26 mole percent of the total amount of surface active fluorocarbon compounds used for the dispersion of the resin particles.

5. A dispersion according to claim 1 wherein said nonionic fluorocarbon compound is a wetting agent which satisfies the following structural formula:

$$C_8F_{17}SO_2\text{--}\underset{|}{\overset{C_2H_5}{N}}\text{----}(CH_2CH_2O)_{11\text{-}14}\text{--}H,$$

where $C_8F_{17}$ represents a straight-chain fluorocarbon.

6. A process for preparing a stable dispersion of positively charged polyfluorocarbon resin particles, and, if desired particles of a different material, which resin particles have an average particle size of less than about 10 μm, by incorporating therein a cationic fluorocarbon surfactant and a nonionic surfactant wherein
   (a) for the nonionic surface active compound a fluorocarbon compound is used;
   (b) the molar ratio between the cationic surface active compound and the nonionic surface active fluorocarbon compound is chosen between 25:1 and 1:3.5;

(c) the total amount of surface active fluorocarbon compounds is at least $3 \times 10^{-3}$ mmoles per m$^2$ of surface area of the polyfluorocarbon particles.

7. The process according to claim 6 wherein the total molar amount of the surface active fluorocarbon compounds is chosen between about $6.10^{-3}$ to $12.10^{-3}$ mmoles per m$^2$ of the surface area of the resin particles.

8. The process according to claim 6 wherein the nonionic surface active fluorocarbon compound is present in an amount of about 17 to 36 mole percent of the total amount of surface active fluorocarbon compounds used for the dispersion of the resin particles.

9. The process according to claim 6 wherein the nonionic fluorocarbon compound is present in an amount of about 26 mole percent of the total amount of surface active fluorocarbon compounds used for the dispersion of the resin particles.

10. The process according to claim 6 wherein said nonionic fluorocarbon compound is a wetting agent which satisfies the following structural formula:

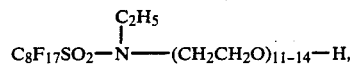

where $C_8F_{17}$ represents a straight-chain fluorocarbon.

11. A dispersion according to claim 1 wherein said fluorocarbon nonionic surface active compound is a perfluorinated polyoxyethylene compound having from 2 to about 18 ethylene oxide groups.

12. A dispersion according to claim 1 wherein said cationic fluorocarbon surfactant is a perfluorinated compound having a quaternary ammonium group.

13. An aqueous electroplating bath containing dispersed positively charged polyfluorocarbon resin particles having an average particle size of less than about 10 μm stablized against settling of the particles with a mixture containing both a cationic fluorocarbon surfactant and a nonionic surfactant which is a perfluorinated polyoxyethylene having 2–18 ethylene oxide group in a molar ratio of from 25:1 to 1:3.5 with the total amount of fluorocarbon surfactant being at least $3 \times 10^{-3}$ m moles per square meter of surface area of said particles.

* * * * *